United States Patent
Chen et al.

(10) Patent No.: US 12,517,493 B2
(45) Date of Patent: Jan. 6, 2026

(54) TONAL VECTOR DETERMINATION FOR PRINTING DEVICE CONTROL

(71) Applicant: Fraunhofer Gesellschaft zur Förderung der angewandten Forschung e.V., Munich (DE)

(72) Inventors: Danwu Chen, Karben (DE); Johann Reinhard, Darmstadt (DE); Philipp Urban, Seeheim (DE)

(73) Assignee: Fraunhofer Gesellschaft zur Förderung der angewandten Forschung e.V., Munich (DE)

( * ) Notice: Subject to any disclaimer, the term of this patent is extended or adjusted under 35 U.S.C. 154(b) by 403 days.

(21) Appl. No.: 18/160,096

(22) Filed: Jan. 26, 2023

(65) Prior Publication Data
US 2023/0236570 A1 Jul. 27, 2023

(30) Foreign Application Priority Data
Jan. 27, 2022 (EP) .................... 22153609

(51) Int. Cl.
  *B33Y 50/02* (2015.01)
  *B33Y 30/00* (2015.01)
  (Continued)

(52) U.S. Cl.
  CPC .......... *G05B 19/4099* (2013.01); *B33Y 30/00* (2014.12); *B33Y 50/02* (2014.12); *G05B 2219/49023* (2013.01)

(58) Field of Classification Search
  None
  See application file for complete search history.

(56) References Cited

U.S. PATENT DOCUMENTS

| | | | |
|---|---|---|---|
| 2002/0136452 A1* | 9/2002 | Schroder | H04N 1/622 382/167 |
| 2004/0109180 A1* | 6/2004 | Braun | H04N 1/6058 358/1.9 |

(Continued)

FOREIGN PATENT DOCUMENTS

EP     1427184 A2     6/2004

OTHER PUBLICATIONS

ICC "Tools for making, editing and assessing ICC profiles"; international Color Consortium, Website: https://www.color.org/profilingtools.xalter (for commercially available tools), retrieved Mar. 6, 2024.

(Continued)

*Primary Examiner* — Ariel Mercado-Vargas
(74) *Attorney, Agent, or Firm* — Miller Johnson

(57) ABSTRACT

A method for determining a tonal vector for generating a control signal for a printing device includes providing a device-independent color value vector. The method includes transforming the device-independent color value vector into the tonal vector using a backward transformation. The method includes determining the backward transformation such that a cost function including an image difference metric term is minimized. The image difference metric term represents a difference between a reference image including device-independent color value vectors and a simulated image. The simulated image is determined by transforming an input image into a tonal image using the backward transformation and transforming the tonal image into the simulated image by using a forward transformation.

19 Claims, 3 Drawing Sheets

(51) Int. Cl.
     G05B 19/4099    (2006.01)
     H04N 1/60    (2006.01)

(56) References Cited

U.S. PATENT DOCUMENTS

| | | | |
|---|---|---|---|
| 2009/0180128 A1 | 7/2009 | Fowler | |
| 2009/0190180 A1* | 7/2009 | Verbeeck | H04N 1/6016 358/3.23 |
| 2010/0142814 A1* | 6/2010 | Damkjer | G06T 7/33 382/167 |
| 2010/0142842 A1* | 6/2010 | Damkjer | G06T 7/12 382/294 |
| 2011/0249280 A1* | 10/2011 | Ito | H04N 1/6019 358/1.9 |
| 2013/0257887 A1* | 10/2013 | Xu | G09G 5/10 345/589 |
| 2014/0016880 A1* | 1/2014 | Kerofsky | G09G 3/3406 382/274 |
| 2017/0139572 A1* | 5/2017 | Sunkavalli | G06F 3/04845 |
| 2018/0117849 A1* | 5/2018 | Brunton | B29C 64/386 |
| 2020/0357099 A1* | 11/2020 | Long | G06N 3/0895 |

OTHER PUBLICATIONS

BasICColor; "Procukte" basiccolor.de, https://www.basiccolor.de/produkte/, retrieved Mar. 6, 2024.
A. Brunton et al. "3D Printing Spatially Varying Color and Translucency" ACM Transactions on Graph; (TOG) 37, 157:1-157:13, Aug. 2018.
A. Brunton et al. "3D Printing Spatially Varying Color and Translucency" ACM Transactions on Graph. (TOG) 37, 157:1-157:13; Appendix C, Aug. 2018.
D. R. Wyble and R. S. Berns, "A Critical Review of Spectral Models Applied to Binary Color Printing," Color. Res. Appl. 25, 4-19, 2000.
G. Rogers, "A generalized clapper-yule model of halftone reflectance," Color. Res. & Appl. 25, 402-407, 2000.
S. Abet and G. Marcu, "A Neural Network Approach for RGB to YMCK Color Conversion" Department of Information Science, Faculty of Science, The University of Tokyo, Japan; pp. 6-9; downloaded on Jun. 7, 2023.
P. Urban, M. R. Rosen, and R. S. Berns, "Accelerating Spectral-Based Color Separation within the Neugebauer Subspace," J. Electron. Imaging 16, 043014-1-043014-11, 2007.
R. Rolleston and R. Balasubramanian, "Accuracy of Various Types of Neugebauer Model" IS&T/SID; Scottsdale, Ariz., pp. 32-36, 1993.
J. Morovic et al. "Accuracy-Preserving Smoothing of Color Transformation LUTs" in Color and Imaging Conference; vol. 2008 (Society for Imaging Science and Technology, pp. 243-246, uploaded Jun. 4, 2014.
V. Monga and R. Bala, "Algorithms for Color Look-Up-Table (lut) Design Via Joint Optimization of Node Locations and Output Values" 2010 IEEE International Conference on Acoustics; Speech and Signal Processing. IEEE 2010; pp. 998-1001, 2010.
A. U. Agar and J. P. Allebach, "An Iterative Cellular YNSN Method for Color Printer Characterization" IS&T/SID; Scottsdale Ariz., pp. 197-200, 1998.
M. Mahy, "Calculation of Color Gamuts Based on the Neugebauer Model" Color Research and Application, vol. 22, pp. 365-374, Dec. 1997.
X. Liu et. al."Certified Monotonic Neural Networks" 34th Conference on Neural Information Processing Systems (NeurIPS 2020); Vancouver, Canada; pp. 1-11, 2020.
S. Tominaga, "Color control using neural networks and its application," in Color Imaging: Device-Independent Color, Color Hard Copy, and Graphic Arts, vol. 2658 (International Society for Optics and Photonics, 1996, pp. 253-260.
J. Preiss, F. Fernandes, and P. Urban, "Color-image Quality Assessment: From Prediction to Optimization", IEEE Transactions on Image Processing, vol. 23, No. 3, pp. 1366-1378, 2014.

C. A. Arikan, A. Brunton, T. M. Tanksale, and p. Urban, "Color-managed 3D-Printing with highly Translucent Printing Materials," in SPIE/IS&T Electronic Imaging Conference, San Francisco, 2015, pp. 9398-9398-9.
P.-C. Hung, "Colorimetric characterization beyond three colorants," in Color Imaging: Device-Independent Color, Color Hardcopy, and Graphic Arts V, vol. 3963. International Society for Optics and Photonics, 1999, pp. 196-207.
B. D. Hensley and J. A. Ferwerda, "Colorimetric characterization of a 3d printer with a spectral model," in Color and Imaging Conference, Society for Imaging Science and Technology, 2013, pp. 160-166.
P. Zolliker and K. Simon, "Continuity of gamut mapping algorithms," Journal of Electronic Imaging, vol. 15, No. 1, p. 013004, 2006.
D. Chen et al. "Deep learning models for optically characterizing 3d printers" Opt. Express 29, 615-631, 2021.
L. Shi et al. "Deep multispectral painting reproduction via multi-layer, custom-ink printing," ACM Transactions on Graph. (TOG) 37, 271, Nov. 2018.
N. Srivastava, et al. "Dropout: A Simple Way to Prevent Neural Networks from Overfitting," The journal machine learning research 15, 1929-1958, 2014.
Z. Wang et al. "Evaluating the effect of noise on 3d LUT-based color transformations," in Conference on Colour in Graphics, Imaging, and Vision, vol. 2010, No. 1. Society for Imaging Science and Technology, 2010, pp. 88-93.
Y. Dong et al. "Fabricating spatially-varying subsurface scattering," ACM Transactions on Graph. (TOG) 29, 62:1-62:10, 2010.
J. Morovic, "Color Gamut Mapping" John Wiley & Sons, 2008.
G. Sharma, Digital Color Imaging Handbook, 1st ed. USA: CRC Press, 2003.
D. Sumin, T. Rittig, V. Babaei, T. Nindel, A. Wilkie, P. Didyk, B. Bickel, J. KR,ivánek, K. Myszkowski, and T. Weyrich, "Geometry-aware scattering compensation for 3d printing," ACM Transactions on Graph. 38, 2019.
A. Balaji, G. Sharma, M. Q. Shaw, and R. Guay, "Hierarchical Compression of Color Look Up Tables," in Color and Imaging Conference, vol. 2007, No. 1. Society for Imaging Science and Technology, 2007, pp. 261-266.
International Color Consortium, "Image technology colour management—architecture, profile format, and data structure" Specification ICC.1:2020; Revision of ICC.1:2004-10, 2010.
Wang, Zhou; Bovik, A.C .; Sheikh, H.R .; Simoncelli, E.P., "Image quality assessment: from error visibility to structural similarity". IEEE Transactions on Image Processing. 13 (4): pp. 600-612, Apr. 2004.
I. Lissner, J. Preiss, P. Urban, M. Scheller Lichtenauer, and P. Zolliker. 2013. "Image Difference Prediction: From Grayscale to Color," Image Processing, IEEE Transactions vol. 22, 435-446, Feb. 2013.
Miheer Bhachech, Mark Shaw, and Jeffrey M DiCarlo, 2006, "Improved color table inversion near the gamut boundary". Copyright 2006 Society for Imaging Science and Technology, pp. 44-49.
R. Hersch and F. Crété, "Improving the yule-nielsen modified spectral neugebauer model by dot surface coverages depending on the ink superposition conditions," in Proc. SPIE, vol. 5667, pp. 434-445, 2005.
Danwu Chen and Philipp Urban: "Inducing Robustness and Plausibility in Deep Learning Optical 3D Printer models" Fraunhofer Institute for Computer Graphics Research IGD, Darmstadt, Germany; vol. 30, No. 11, May 23, 2022, Optics Express 18119.
P. Urban and M. R. Rosen, "Inverting the Cellular Yule-Nielsen modified Spectral Neugebauer Model," in Ninth International Symposium on Multispectral Color Science and Application, Taipei, Taiwan, 2007, pp. 29-35.
J. Viggiano, "Modeling the Color of Multi-color Halftones," in TAGA Proceedings, 1990, pp. 44-62.
A. Murray, "Monochrome reproduction in photoengraving," J. Frankl. Inst. 221, 721-744, 1936.
L. Simonot, R. D. Hersch, M. Hébert, and S. Mazauric, "Multilayer four-flux matrix model accounting for directional-diffuse light transfers," Appl. optics 55, 27-37, Jan. 2016.

(56) References Cited

OTHER PUBLICATIONS

V. Babaei and R. D. Hersch, "N-ink Printer Characterization With Barycentric Subdivision," IEEE Transactions on 366 Image Process. 25, 3023-3031, 2016.

C. J. Zoller et al. "Parallelized Monte Carlo software to efficiently simulate the light propagation in arbitrarily shaped objects and aligned scattering media," Journal of Biomedical Optics 23(6), 065004 (Jun. 2018), Downloaded From: https://www.spiedigitallibrary.org/journals/Journal-of-Biomedical-Optics on Jul. 4, 2023.

D. Littlewood, P. Drakopoulos, and G. Subbarayan, "Pareto-Optimal Formulations for Cost versus Colorimetric Accuracy Trade-Offs in Printer Color Management," ACM Transactions on Graphics, vol. 21, No. 2, Apr. 2002, pp. 132-175.

Johann Reinhard, Philipp Urban, "Perceptually Optimizing Color-Lookup Tables" IEEE Transactions on Image Processing, vol. 32, 2023; pp. 403-414.

M. Hašan et al. "Physical Reproduction of Materials with Specified Subsurface Scattering," ACM Transactions on Graphics, 29, 3, Aug. 2010.

A. Brunton, C. A. Arikan, and P. Urban, "Pushing the Limits of 3D Color Printing: Error Diffusion with Translucent Materials" ACM Transactions on Graphics, vol. 35, No. 1, Article 4, Dec. 2015.

A. L. Maas, A. Y. Hannun, and A. Y. Ng, "Rectifier Nonlinearities Improve Neural Network Acoustic Models" Proceedings of the 30th International Conference on Machine Learning, Atlanta, Georgia, USA, p. 3, 2013.

P. Urban et al. "Redefining A in RGBA: Towards a Standard for Graphical 3D Printing" ACM Transactions on Graphics, vol. 38, No. 3, Article 21, May 2019, pp. 1-14.

R. Hersch, F. Collaud, and P. Emmel, "Reproducing color images with embedded metallic patterns," ACM Transactions on Graphics. (TOG) 22, 427-434, 2003.

M. Hébert and R. D. Hersch, "Review of Spectral Reflectance Models for Halftone Prints: Principles, Calibration, and Prediction Accuracy," Color. Res. & Appl. 40, 383-397, 2015.

M. R. Rosen, E. F. Hattenberger, and N. Ohta, "Spectral Redundancy in a Six-Ink Ink Jet Printer," Journal of Imaging Science and Technology, vol. 48, 2004, pp. 194-202, May/Jun. 2004.

R. Hersch et al. "Spectral reflection and dot surface prediction models for color halftone prints," Journal of Electronic Imaging 14(3), 033001, Jul.-Sep. 2005.

S. Tsutsumi, M. Rosen, and R. Berns, "Spectral Reproduction using LabPQR: Inverting the Fractional-Area-Coverage-to-Spectra Relationship," ICIS, IS&T, Rochester, NY, 2006, pp. 107-110.

P. Urban and R.-R. Grigat, "Spectral-Based Color Separation Using Linear Regression Iteration," Color. Res. Appl. 31, 229-238, Jun. 2006.

M. Abadi et. al. "TensorFlow: Large-Scale Machine Learning on Heterogeneous Distributed Systems," 2018.

J. A. C. Yule and W. J. Nielsen, "The Penetration of Light Into Paper and Its Effect on Halftone Reproduction," in Tech. Assn. Graphic Arts, vol. 4, 1951, pp. 65-76.

H. E. J. Neugebauer, "The Theoretical Basis of Multicolor Letterpress Printing (Translated D. Wyble and A. Kraushaar)," Color. Res. Appl. 30, 2005, pp. 322-331.

T. P. Van Song, C. Andraud, and M. V. Ortiz-Segovia, "Towards Spectral Prediction of 2.5D Prints for Soft-Proofing Applications," in 2016 Sixth International Conference on Image Processing Theory, Tools and Applications (IPTA), 2016, pp. 1-6.

K. Falkenstern et al. "Using Image Quality Metrics to Evaluate an ICC Printer Profile," Color and Imaging Conference, vol. 2010, No. 1. Society for Imaging Science and Technology, 2010, pp. 244-249.

B. M. Vu et al. "Visual perception of 3D printed translucent objects," 2016 Society for Imaging Science and Technology, 24th Color and Imaging Conference, San Diego, CA, 2016, pp. 94-99.

I. Goodfellow, Y. Bengio, A. Courville, and Y. Bengio, Deep learning, vol. 1 Chapter 5 and 7, MIT press Cambridge, 2016.

Wikipedia; "Laplace operator" Wikpeadia.org, https://en.wikipedia.org/w/index.php?title=Laplace_operator&oldid=, Jan. 12, 2024.

Wikipedia; "Structural similarity" Wikipedia.org, https://en.wikipedia.org/wiki/Structural_similarity, Jan. 5, 2024.

* cited by examiner

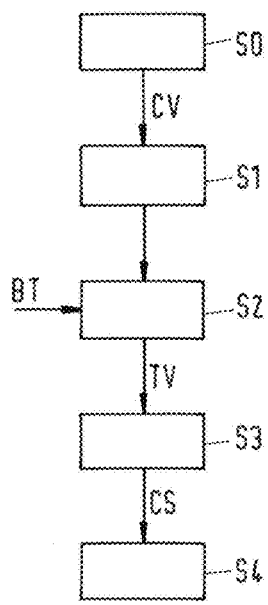
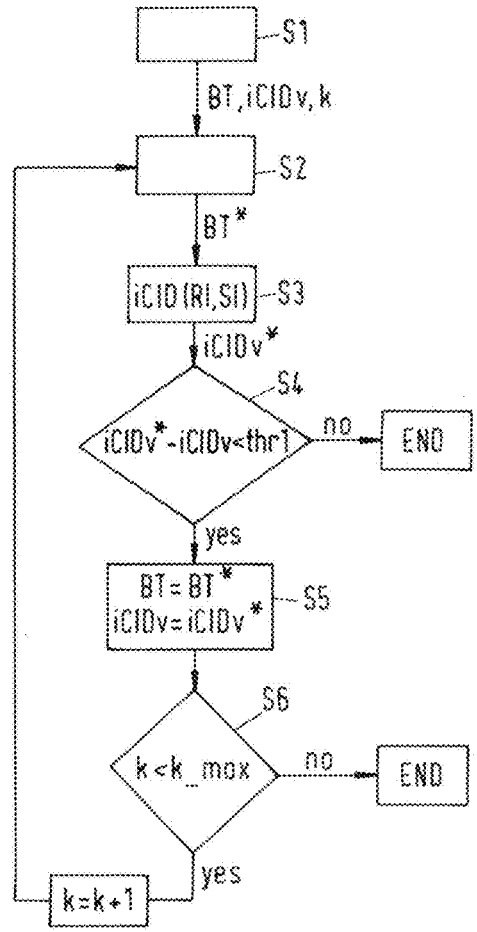
Fig.1
Fig.2
Fig.3

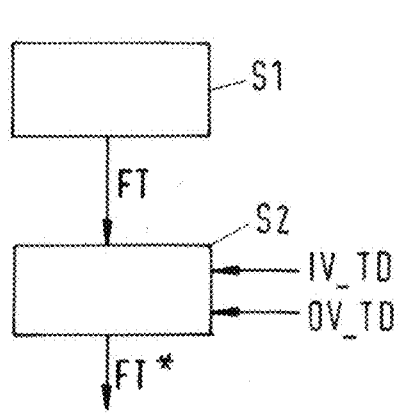
Fig.4
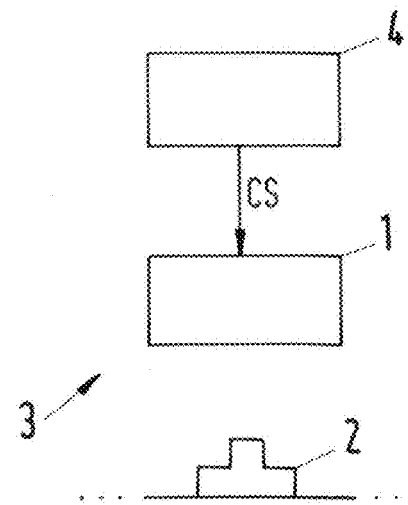
Fig.5
Fig.6

TONAL VECTOR DETERMINATION FOR PRINTING DEVICE CONTROL

CROSS-REFERENCE TO RELATED APPLICATIONS

This application claims priority to EP 22153609.7 filed Jan. 27, 2022, the entire disclosure of which is incorporated by reference.

FIELD

This disclosure relates to a method for determining a tonal vector for generating a control signal for a printing device, a computer program product and a printing system.

BACKGROUND

In order to control 3D printers to accurately reproduce given visual quantities (color and/or translucency), it is required to compute exactly the ratio of printing materials that must be mixed by the 3D printer in order to reproduce these quantities. In the process pipeline of determining the ratio of printing materials it is regularly required to apply a backward transformation by which tonal vectors are determined from given visual quantities. It can be also required to apply a forward transformation by which visual quantities are determined from given tonal vectors. The backward transformation must invert the forward transformation. However, there are not always unique solutions which results in the fact that the same visual quantities can be obtained by different tonal vectors. Furthermore, the backward transformation is usually required to intrinsically include gamut mapping, i.e. strategies to compute tonal vectors if the given input visual quantity cannot be reproduced by the printer. For the latter, the visual quantity reproduced by the printed object should minimize the perceptual error to the given input visual quantity and should also preserve the perceived relationship between visual quantities (to avoid banding artifacts e.g. in color gradients).

It is known to apply multidimensional lookup tables while performing the aforementioned transformations that are evaluated in the 3D printing pipeline. It is further known to apply an interpolation in order to determine tonal vectors or visual quantities for a given input (i.e. an input visual quantity or an input tonal vector) which is not explicitly provided in the table. In case of the backward transformation, this table is usually referred to as CLUT (color-lookup table). The encoding scheme can be similar to standards by the International Color Consortium (ICC).

It is known to determine the forward transformation by using physical and empirical models which are e.g. described in the document "D. Chen and P. Urban, "Deep learning models for optically characterizing 3d printers," Opt. Express 29, 615-631 (2021)". The physical models are usually just a simplification of the whole process of the material-light-interaction. These models ensure monotonicity and plausibility but have limited degrees of freedom to model various aspects of the printing such as postprocess treatment. This may lead to big prediction errors. Also known is to apply deep-learning models and training strategies with a very high accuracy while using a moderate number of training samples which is also outlined in the aforementioned document. These models however, may create noisy predictions and do not ensure plausibility heuristics of their predictions.

A further problem of a forward transformation which is built based on data (by using e.g. a physical model, a neural network, an interpolation-based approach or other approaches) is that the data that is used to build the forward transform tends to have errors that lead to violations of a monotonic mapping relationship between tonal vectors and visual quantities and results in implausible bumpiness of the output, e.g. the visual quantities. These errors can be due to various root causes, in particular printing errors or errors of the measurement of the visual quantities that are provided by a certain tonal vector. In particular neural-network-based forward transformations tend to have monotonicity violations and implausible bumpiness in the aforementioned mapping relationship because the neural network-based model overfits to the training data that has errors itself. The aforementioned monotonicity violations and implausible bumpiness of a forward transformation lead to inconsistent appearance (color or translucency) on the resulting 3D-prints as a slightly different tonal vector can result in noticeable differences in appearance.

With respect to the determination of the backward transformation focusing on color reproduction in 2D color printing, multiple approaches have been proposed and are already used in commercial tools (ICC profiling tools). For 3D printing, an algorithm to compute the lookup table to obtain the tonal vectors for a given color and translucency is e.g. outlined in the document "A. Brunton, C. A. Arikan, T. M. Tanksale, and P. Urban, "3d printing spatially varying color and translucency," ACM Transactions on Graph. (TOG) 37, 157:1-157:13 (2018)" and the separate and supplemental appendix C to the document which is electronically available at https://dLacm.org/doi/10.1145/3197517.3201349 as supplemental material. All these transformations are usually either not very accurate or they contain artifacts such as banding artifacts caused by interpolation since neighboring nodes contain substantially different tonal vectors. Several ways of optimizing the lookup table (in case of color: CLUT) encoding the backward transform have been proposed but do not optimize all the issues at the same time. In the document "J. Morovic, A. Albarran, J. Arnabat, Y. Richard, and M. Maria, "Accuracy-preserving smoothing of color transformation luts," in Color and Imaging Conference, vol. 2008 (Society for Imaging Science and Technology, 2008), pp. 243-246", an accuracy preserving smoothing along lightness is proposed that does not correct gamut-mapping-induced discontinuities. The document "Miheer Bhachech, Mark Shaw, and Jeffrey M DiCarlo. 2006. Improved color table inversion near the gamut boundary. In Color and Imaging Conference, Vol. 2006. Society for Imaging Science and Technology, 44-49" describes to extrapolate gamut boundary vertices to avoid gamut-mapping-induced CLUT discontinuities at the gamut boundary but does not propose to optimize for overall smoothness of the CLUT.

Further problems related to the backward transformation are that in particular for 3D printing systems for which the dimension of the tonal space is higher than the dimension of the color space, e.g. systems with more than three printing materials (e.g. more than CMY colors), multiple tonal vector combinations can provide the same color reproduction in a 3D color space, while only one of the combinations is stored in the CLUT. A poor selection of the stored tonal vectors, however, can lead to interpolation artifacts in the color reproduction. An optimal CLUT would result in accurate colors, smooth transitions, and optimal gamut exploitation which, however, is not provided by existing approaches. Further, some 3D multi-material printers can print with extended material sets beyond the color appearance, such as a clear material to replicate transparent or translucent appearances. Usually, the color gamut becomes smaller because mixing in the additional material reduces the amount of color material per volume element. The optimal computation of the CLUT for such 3D printers which provide an optimal color reproduction can be challenging.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

There is the technical problem of providing a method for determining a tonal vector for generating a control signal for a printing device, in particular a three-dimensional printing device, a computer program product and a printing system, in particular a 3D printing system, which avoid the aforementioned disadvantages and, in particular, allow a high quality printing, more particular the printing of printing objects with an accurate color reproduction and no or a minimized number of artifacts.

The solution to the technical problem is provided by the subject-matter with the features of the independent claims. Further advantageous embodiments of the invention are provided by the subject-matter with the features of the sub claims.

A method for determining a tonal vector for generating a control signal for a printing device is proposed, the method comprising:

providing a device-independent color value vector,
transforming the device-independent color value vector into the tonal vector using a backward transformation, characterized in that the method further comprises the steps of
determining the backward transformation such that a cost function comprising an image difference metric is minimized, wherein the image difference metric represents a difference between a reference image comprising device-independent color value vectors and a simulated image, wherein the simulated image is determined by transforming an input image into a tonal image using the backward transformation and transforming the tonal image into the simulated image by using a forward transformation.

The printing device can be a two-dimensional printing device or a three-dimensional printing device.

The device-independent color value vector can be defined in a printing device-independent color space. The space can preferably be the CIELAB color space which is well known to the skilled person. In that case, the device-independent color vector can comprise an L*-entry representing the perceptual lightness (L*) and two entries, namely an a*-entry and a b*-entry, representing the four unique colors of human vision red, green, blue and yellow. It is also possible that the color value vector comprises an entry representing translucency. In this case the color value vector can also be referred to as color and translucency value vector.

It is, of course, possible to use other embodiments of the device-independent color value vector. The device-independent color space can be an n-dimensional space.

In order to provide the device-independent color value vector in a 3D printing scenario, i.e. before the backward transformation is performed, a modelling step can be performed in which a model of the 3D printing object can be created, e.g. by computer aided design (CAD). The modelling step can be part of the claimed method. Such a model can also be generated by 3D-scanning, in particular by capturing shape, color and, if desired, translucency information of an object which is to be reproduced by printing. The model can encode reproduction information, wherein a reproduction information can denote or comprise a shape information, color information and/or translucency information. These pieces of information provide a specification of what shape, color and/or translucency perception from the printing object a user wishes to have. In other words, the information encodes set values for the shape, color and/or translucency of the printing object. The modelling step can be performed independent of the 3D printing device which is to be used. By the modelling step, input data for the proposed method can be generated. The input data can encode shape information as texture information or vertex information. Encoding shape information as both vertex and texture information advantageously allows for a more compact shape information. For example, color and, if applicable, translucency information can be encoded by a RGBA signal on the object's surface, for example in form of a RGBA texture or per-vertex RGBA attributes. An RGBA signal can e.g. be provided by a RGBA vector, wherein entries of the "RGB" portion encode a color information and the entry of the "A" portion encodes a translucency information. This is e.g. disclosed in the document "Urban, P., Tanksale, T. M., Brunton, A., Vu, B. M., & Nakauchi, S. (2019). Redefining a in RGBA: towards a standard for graphical 3D printing. ACM Transactions on Graphics (TOG), 38(3), 1-14". Thus, a desired color and translucency can be assigned to the printing object or parts thereof. Input data can also be volumetric data, e.g. data which encode a stack of multiple 2D RGBA images. Examples for a possible data format of input data is the so-called .obj data format, the .wrl data format or the 0.3mf data format whereas the color and translucency is embedded in such formats as a RGBA texture file encoded e.g. in a PNG data format or a TIFF data format. For example, the 0.3mf data format is created to store textured 3D models for 3D printing by an industrial consortium. Preferably, the reproduction information can be provided by a texture image, wherein every point or selected points on a 3D surface representation of the printing object has assigned coordinates in the domain of a texture image. In a 2D printing scenario, the input data can encode color information, e.g. RGB information, of a two-dimensional representation which is to be reproduced by the printing process. It is further possible that gloss or bump effects are encoded.

Based on the the input data, the device-independent color value vector can be determined. In particular, the RGB portion of the RGBA signal or vector can be transformed into the aforementioned CIELAB color space in order to provide the device-independent color value vector, i.e. as a CIELAB vector. Suitable transformations are known to the skilled person and are not subject of the proposed invention.

Based on the tonal vectors provided by the backward transformation, control data for a printing device can be generated, wherein the control data is used to control the printing process. A 3D printing process can e.g. be an extrusion-based process, a wire-based process, a granular-based process, a power-bed process or a lamination-based process. Preferably, the 3D printing process comprises a material jetting process with a subsequent polymerisation. In such processes, one or more liquid printing materials, e.g.

liquid photo polymers, are applied into or onto a layer and exposed to radiation, e.g. to a laser beam, in order to harden the exposed printing material. For example, printing materials can be provided by printing inks, wherein the printing inks can be hardened or cured after the application on to or into a layer, e.g. by exposure to light, in particular to UV radiation. The printing inks can have different colors and/or degrees of translucency. The process can also be referred to as polyjetting which is also known as multi-jet modelling. A 2D printing process can be an inkjet printing process, a gravure printing process, a flexographic printing process, an offset printing process or an electrophotographic printing process.

The tonal vector denotes a vector comprising at least one, preferably multiple, entry/entries, wherein an entry of the vector represents the amount of a specific printing material used by the printing device. A tonal vector can also comprise entries with values that are to be transformed, e.g. by a function, to the amount(s) of one or multiple printing material(s). Such a function can be, for instance, a linearization function which is known to the skilled person. A definition of a tonal vector can also be found in the document "D. Chen and P. Urban, "Deep learning models for optically characterizing 3d printers", Opt. Express 29, 615-631 (2021)".

The tonal vector is a device-specific vector. Further, the tonal vector is defined in a tonal space which can be a m-dimensional space, wherein the dimension m of the tonal space can be different from the dimension n of the device-independent color space. As an example, the tonal vector can be a CMYK vector, wherein C is the tonal value for cyan printing material, M is the tonal value for magenta printing material, Y is the tonal value for yellow printing material and K is the tonal value for black printing material. As a further example, the tonal vector can comprise the CMYK tonal values and at least one further value, e.g. a tonal value for a transparent printing material and/or a further tonal value for white printing material and/or a further tonal value for a support material, e.g. y value of a CMYKy vector. By applying the backward transformation to a given device-independent color value vector as an input, the tonal vector can be determined as an output of the backward transformation.

According to the invention, the backward transformation which is used to determine the tonal vector is determined such that a cost function is minimized, wherein the cost function comprises an image difference metric term, i.e. a term representing the difference between two images. In other words, the cost function, in particular on term of the cost function, is determined based on the evaluation of an image difference metric which, given two images, returns a value representing the difference between the images. The determination of the backward transformation can be part or step of the proposed method. However, it is also possible to determine the optimized backward transformation in a pre-processing step, in particular once for a specific printing device and to use this predetermined backward transformation in subsequent printing processes.

The image difference metric term represents in particular a difference between a reference image and a simulated image, wherein a value of the image difference metric, i.e. a value provided or returned by the image difference metric given the reference and the simulated image as two input images for the metric, correlates with the perceived difference of the images, i.e. the more different the images, the higher the image difference metric value. A well-known example metric is the structural similarity index measure (SSIM) which is e.g. described in the document Wang, Zhou; Bovik, A. C.; Sheikh, H. R.; Simoncelli, E. P. (2004 Apr. 1). "Image quality assessment: from error visibility to structural similarity". IEEE Transactions on Image Processing. 13 (4): 600-612. In the case of SSIM, the image difference metric can be calculated as 1-SSIM since a SSIM value of 1 corresponds to a perfect match of images.

The simulated image is determined by transforming an input image into a tonal image using the backward transformation and then transforming the tonal image into the simulated image by using a forward transformation. The input image and the reference image comprise or consist of multiple device-independent color value vectors. The reference image used to determine the image difference metric value can be a reference image which corresponds to the input image, i.e. an input image-specific reference image. As will be explained in the following, the input image-specific reference image can be determined by (a) determining a transformed input image and (b) adapt the transformed image. This can also be referred to as a filtering of the input image.

The input image and the reference image can e.g. be a multi-dimensional image. As explained in the following, the input image and the reference image can also be a two-dimensional image which comprises or consists of multiple device-independent color value vectors selected from a two-dimensional subspace of the device-independent color space. The simulated image has the same dimension as the input image and, preferably, the same resolution. The forward transformation can be a predetermined transformation, in particular a transformation which is determined in a pre-processing step, more particular once for a specific printing device. It is possible that the forward transformation is determined as outlined below. The reference image can be equal to the input image. Preferably, however, the reference image is determined based on the input image, in particular by transforming the input image and adapting the transformed input image. As an example, the reference image is determined by transforming the input image into a tonal image using an initial, i.e. preset or predetermined, backward transformation, transforming the tonal image into a simulated image (as outlined before) and then adapt the simulated image, in particular adapt or change at least one entry of at least one color value vector of the simulated image. Adaption can be performed such that at least one predetermined criterion is fulfilled. This will be explained in more detail later.

An image difference metric can provide or return a value which represents a difference between two images, in particular the perceived difference. This value can represent a difference in color and/or contrast and/or structure and/or other characteristics, in particular for different locations in the images. Example difference metrics are described in the document "Jens Preiss; Felipe Fernandes; Philipp Urban: Color-Image Quality Assessment: From Prediction to Optimization, IEEE Transactions on Image Processing (Volume: 23, Issue: 3, March 2014)".

Minimization of the cost function can be performed by adjusting one or preferably multiple parameters of the backward transformation, i.e. parameters which are used to perform the backward transformation. As mentioned below, such parameters can be tonal value vectors assigned to specific color value vectors by a CLUT.

Minimization can be performed iteratively, wherein exactly one or multiple, i.e. at least two, parameter(s) are varied in each iteration step. The iterative minimization can be terminated if the cost function value does not change, in particular decrease, more than a predetermined amount between two or more iteration steps. Alternatively, the minimization is terminated if a predetermined number of iteration steps is reached. To start iteration, an initial backward transformation can be used. This initial backward transformation can be predetermined, e.g. by methods known to the skilled person, or preset. This initial backward transformation can then be adjusted in each iteration step, wherein an altered backward transformation can replace the standing backward transformation if the cost function value is reduced by the adjustment.

Results have shown that a high color accuracy and also smooth color gradients and smooth transitions of the tonal vectors can be achieved if the backward transformation is determined as proposed. Therefore, artifacts introduced by the color profile creation are reduced and a better appearance of printed objects are achieved. Further, for backward transformation of color value vectors which are beyond the color appearance achievable by the printing device, a distance between the gamut mapped and the original colors is minimized. In particular for different translucency levels, the proposed method allows to determine tonal values which minimize the difference between colors of the printing object and the optimal or desired color (defined by the input data) according to the image difference metric.

In the printing pipeline, the tonal vectors which are determined by the proposed method can be used to generate control signals for a printing device. It is e.g. possible to determine one printing material or a mixture of multiple printing materials to be applied to a selected volume of the printing object, e.g. a voxel, based on the tonal vectors and to generate control signals by which the printing device is controlled accordingly and such that a printing object is printed, in particular a 2D or 3D printing object. An example method for such determination is a halftoning algorithm or any other suitable algorithm. Such algorithms are well known to the skilled person. Further, a voxelization can be performed, wherein voxels of a printer-specific build space can be classified as object voxels or non-object voxels. Further, a device-independent color value vector can be assigned to each object voxel and then be transformed into the tonal vector. Alternatively, a device-independent color value vector can be first transformed into the tonal vector and then, a tonal vector can be assigned to each object voxel. Example algorithm for voxelization, assigning device-independent color value vectors to object voxels or assigning tonal vectors to object voxels are also known to the skilled person.

The invention also relates to a method for generating control signal for a printing device, wherein the control signals are determined based on the tonal vectors. Further, the invention relates to a method for printing a printing object using the control signals for controlling the printing device.

In a preferred embodiment, the image difference metric is the improved Color-Image-Difference (iCID) metric. The iCID metric is described in "Jens Preiss; Felipe Fernandes; Philipp Urban: Color-Image Quality Assessment: From Prediction to Optimization, IEEE Transactions on Image Processing (Volume: 23, Issue: 3, March 2014)". The document also describes how the iCID is determined for two images. The iCID is a full-reference image difference metric, wherein the value returned by the iCID given two input images represents combined differences in lightness, chroma and hue as well as contrast and structural errors in lightness and chroma between the images. It compares two images with respect to these differences using sliding windows.

Determination of the image difference metric as iCID metric advantageously allows a very accurate and robust determination of a perceived image difference and consequently a reliable calculation of the cost function value which, in turn, leads to a very accurate determination of the backward transformation providing the above outlined advantages.

In a further embodiment, the backward transformation is performed using at least one assignment of tonal vectors to selected device-independent color value vectors. The assignment can be provided by a table wherein entries of a first column correspond to color value vectors and entries of the second column correspond to tonal vectors and entries in the same row are assigned to each other. The table can be the aforementioned CLUT. Selected color value vectors of the set of all color value vectors in the color space for which the assignment provides an assigned tonal vector can also be referred to as grid points in the color space. The tonal vectors which are assigned to the grid points can also be referred to as grid points of the tonal space.

If the input color value vector for which a tonal vector is to be determined is not a member of the set of grid points, the tonal vector can be determined by applying an interpolation algorithm, in particular multilinear interpolation algorithm. An example interpolation algorithm is known to the skilled person. In this case, it is possible to determine the tonal vector by taking into account the tonal vectors which are assigned to the grid points which are located in a local neighborhood of the input color value vector, wherein the local neighborhood has a predetermined size.

Further, at least one tonal vector of the at least one assignment is varied in order to minimize the cost function. In other words, exactly one, multiple but not all, or all tonal vectors of the assignment, i.e. the tonal vectors assigned to the aforementioned grid points, provide optimization parameters. As mentioned before, the variation can be performed iteratively. If the assignment is provided by a table, at least one entry of the table is varied in order to minimize the cost function. Results have shown that varying the tonal vectors of the assignment provides a very effective and fast way of determining a backward transformation providing the aforementioned advantages.

In a further embodiment, the backward transformation is determined using multiple reference images. Different reference images can comprise/consist of different device-independent color value vectors. It is in particular possible that different reference images comprise/consist of color value vectors within different subspaces of the color space. As an example, different subspaces can comprise a*- and b*-values for different L*-values if the color value vectors are defined in the LAB (or CIELAB) space. In this case, it is possible that for each L*-value of the range from 0 (inclusive) to 100 (inclusive), i.e. for 101 different L* values, an reference image with 256 different a*-values, e.g. ranging from −127 (inclusive) to 128 (inclusive), and 256 different b*-values, e.g. ranging from −127 (inclusive) to 128 (inclusive), is generated in order to provide 101 different 256×256 reference images. Different reference images can be generated out of different input images as will be explained in the following.

Further, at least one tonal vector of the assignment is varied in order to minimize the cost function value for all reference images which involves determining the image difference metric value for all reference images, wherein the images for which the metric value is determined are provided by the reference image and a simulated image, the simulated image being generated based on the input image which corresponds to the reference image. In this scenario, the reference image is constant during the minimization and the simulated image changes with the variation of the backward transformation. It is possible that the cost function is minimized for each reference image independently, in particular in a reference image-specific iteration.

In this case, at least two reference image-specific minimizations of the cost function can be performed simultaneously and/or the backward transformation resulting from a first reference-image specific minimization can provide an initial backward transformation for a further reference-image specific minimization. Alternatively, the cost function can be minimized for all reference image simultaneously. Performing the minimization for different reference images advantageously allows to minimize the risk that the color error for out of gamut colors is reduced at the expense of structural errors.

In particular, a first reference image of the set of at least two reference images comprises color value vectors with varying color-related entries, e.g. varying a*- and b*-related entries, and with a constant first perceptual lightness, e.g. a constant L*-related entry, wherein a further reference image of the set comprises color value vectors with varying color-related entries and with a constant further perceptual lightness, wherein the first perceptual lightness is different from the further perceptual lightness. This advantageously allows a very simple and fast generation of reference images.

In a further embodiment, the minimization is performed iteratively, wherein in each iteration step only
  one tonal vector of the assignment or
  the tonal vectors of a subset of all tonal vectors of the assignment
is/are varied, wherein the varied tonal vector replaces the original tonal vector if the cost function value is decreased. The tonal vector which is varied can be the tonal vector which is assigned to a selected color value vector of the assignment. If multiple tonal vectors are varied in one iteration step, at least one entry of each of the multiple tonal vectors can be varied in the iteration step. If the assignment is provided by a table, one or more entries of the table (representing tonal vectors) can be varied in an iteration step. In particular, not all tonal vectors of the assignment are varied in one iteration step. This ensures that no interferences due to simultaneous changes of tonal vectors occur, wherein such interferences might affect the minimization of the cost function, e.g. by extending the time required for minimization or by leading to a set of tonal vectors which does not minimize the cost function. Therefore, varying exactly one tonal vector or only tonal vectors of a subset result in a fast and accurate determination of the backward transformation which provides the aforementioned advantages. If only one tonal vector is varied in one iteration, the iterations of different tonal vectors can be performed sequentially.

In a further embodiment, a first tonal vector or tonal vectors of a first subset are varied in a first iteration step, wherein a further tonal vector or tonal vectors of a further subset are varied in a further iteration step, the further tonal vector being different from the first tonal vector and the further subset being different from the first subset. In other words, the tonal vectors of the aforementioned subset can be varied. This means that a tonal vector or tonal vectors of one subset are varied only once in an iteration step. In a further iteration step, a further tonal vector or tonal vectors of a further subset are varied once. The further iteration step can be a step following the first iteration step, i.e. a subsequent step. It is, however, also possible to perform both steps simultaneously. The cost function is thus evaluated based on the varied tonal vector(s) in each iteration step. After having varied all tonal vectors or all subsets, the variation of tonal vectors or subsets can be repeated, e.g. until a predetermined number of iteration steps has been reached or if the value of the cost function does not change, in particular decrease, more than a predetermined amount. This advantageously allows a fast and effective minimization of the cost function and thus a fast and accurate determination of the backward transformation.

In a further embodiment, the tonal vectors of the subset of all tonal vectors of the assignment are selected as particular tonal vectors, namely tonal vectors which are assigned to color value vectors of a subset of the device-independent color value vectors. The color value vectors of the subset, in turn, are chosen such that no other color value vector of the subset is arranged in an influenced neighborhood of a selected color value vector of the subset. The influenced neighborhood comprises color value vectors being affected by the change of the tonal vector which is assigned to the selected color value vector. The influenced neighborhood is a local neighborhood of the selected color value vector in the color space or a subspace thereof, in particular in the input image.

If only one tonal vector, i.e. at least one entry of the tonal vector, is varied, this variation will only affect color values in a local neighborhood of the selected color value vector to which the the tonal vector is assigned in a simulated image, in particular due to an interpolation used by the backward transformation. In particular, a change of a color value between corresponding pixels of an input image and a simulated image can only occur for pixels, i.e. color value vectors, in the local neighborhood if only the tonal vector assigned to the selected color value vector is varied. The selected color value vectors of the subset are now chosen such that no overlap between the vector-specific local neighborhoods exists. This advantageously minimizes or excludes the aforementioned interference. As explained before, determining the tonal vector for a given input color value vector might involve an interpolation which takes into account tonal vectors assigned to color value vectors within a local neighborhood of the given input color value vector. The size of the local neighborhood depends on the type of interpolation which is involved. If now multiple tonal vectors assigned to color value vectors within the local neighborhood are varied within the minimization simultaneously, an interference might occur. It is possible that a decrease of the cost function value by the variation of a first tonal vector is compensated fully by the variation of a further tonal vector which would lead to the undesired result that the minimizing variation of the first tonal vector will not be considered. Avoiding such an interference therefore leads to a fast and accurate determination of the backward transformation which provides the aforementioned advantages.

In a further embodiment, variations of multiple tonal vectors are performed simultaneously. In other words, the determinations of the vector-specific cost function values can be performed simultaneously. It is in particular possible that two different iteration steps which involve the variation of different tonal vectors or different subsets of tonal vectors are performed simultaneously. Simultaneously performed processes can be performed by different sub units of a computing unit, in particular different cores or processors of a multi-core or multi-processor computing unit. This advantageously allows a very fast determination of the backward transformation.

In a further embodiment, the image difference metric is evaluated based on color value vectors in a first metric window and a further metric window, wherein the color value vectors of the windows provide the input images for the evaluation of the metric. The first metric window is a window with a predetermined size around a color value vector in the simulated image for which the metric or a part thereof is to be evaluated. The further metric window is a window with the predetermined size around the corresponding color value vector in the reference image. The color value vector for which the metric is to be evaluated can provide a center point of the window. It is further possible that the image difference metric is evaluated for each color value vector of the reference image based on the described windows and that the resulting image difference metric is determined as the sum of all the metrics. In case that the simulated image is a two-dimensional image, the window can have a size of g×h pixels, wherein g can be different or equal to h and wherein g is smaller than the total number of pixels in a row of the simulated image and h is smaller than the total number of pixels in a column of the simulated image. Further, the color value vectors of the subset are chosen such that an influence neighborhood of a selected color value vector of the subset does not overlap with the metric window of all remaining color value vectors of the subset. This advantageously further minimizes or excludes the aforementioned interference and therefore leads to a fast and accurate determination of the backward transformation which provides the aforementioned advantages.

In a further embodiment, the reference image is determined by transforming the tonal vectors assigned to selected device-independent color value vectors into a transformed input image using the forward transformation and adapt the transformed image, in particular adapt or change at least one entry of at least one color value vector of the transformed image. The adaption can be performed such that at least one predetermined criterion is fulfilled. In particular, the adaption can be performed such that the lightness is monotonic and/or smooth
the chroma is smooth
the hue of the reference image is equal to the hue of the input image.

In general terms, the adaption can be performed such that at least one predetermined color-related or color-specific criterion is fulfilled, in particular a criterion related to the perceived colors or color attributes. The criterion can be related to color attributes such as the aforementioned lightness, chroma and/or hue. The criterion can be fulfilled if the color of the adapted image, in particular one or more color attribute(s), has/have one or more predetermined characteristics. If this is not the case, the criterion is not fulfilled. To perform the adaption, the transformed image (which comprises pixels or voxels provided by the tonal vectors of the aforementioned assignment) can be transformed from the CIELAB color space to the CIELCh color space. Then, the lightness channel, the chroma channel and the hue channel can be processed independently. The lightness is monotonic if for a given column of lightness values starting from an end entry with a maximal value, every next value of the column is smaller or equal to the next. The lightness values of the column belong to color value vectors, in particular of the aforementioned assignment, with the same a* and b* values but different L* values. It is possible to overwrite a selected value of the lightness with a value of a previously considered lightness if the relation of the selected value and the previously considered value violates the monotonicity. Ensuring monotony of the lightness advantageously reduces artifacts which are in particular caused by color value vectors outside the gamut of a selected printing device. Smoothing of the chroma can be performed in the hue linear space by replacing values in the gamut with an ideal chroma value provided by the corresponding chroma value of the input image and outside the gamut by conditional smoothing with an averaging filter, e.g. a box filter, in the a*-b* plane which replaces a selected chroma value by the average chroma value if the average chroma value provided by the filter is closer to the ideal chroma value than the selected chroma value. This also reduces artifacts which are in particular caused by color value vectors outside the gamut of a selected printing device.

Ensuring that a hue of the reference image is equal to the hue of the input image can be provided by setting the selected hue value of the transformed image to the corresponding hue value of the input image. This also reduces artifacts which are in particular caused by color value vectors outside the gamut of a selected printing device.

The transformed image then comprises a color value vector for each tonal vector of the assignment. A reference image of a preset (or desired) size, i.e. with a different number of color value vectors being elements of the reference image, can then be determined based on the transformed image and its elements, e.g. by interpolation. The determination of the at least one reference image can be performed once, in particular before the minimization is started. The at least one reference image is constant during the minimization.

In a further embodiment, the cost function further comprises a term representing a Laplacian of the tonal image. A value of the term can correlate with the smoothness of the tonal image which comprises/consists of the tonal vectors being varied for minimizing the cost function. This advantageously provides a smooth transition between neighboring tonal vectors of the resulting assignment which advantageously improves the output of the aforementioned determination of a printing material or a mixture of multiple printing materials to be applied to a selected volume of the printing object based on the tonal vectors, e.g. the output of a halftoning process and ensures that smooth color gradients are reproduced without bumps and banding artifacts. The term representing the image difference metric and the term representing the Laplacian can be weighted by different weights to determine the cost function, e.g. a sum of these weighted terms.

In a further embodiment, the backward transformation is determined for multiple translucency values. In this case, the device-independent color value vector is extended to a device-independent color and translucency value vector which can comprise one entry or value representing a translucency which should be reproduced by the printed object. Further, the tonal vector can also comprise an entry representing a clear or translucent material. Then, for each translucency value of a set of t translucency values, a translucency-specific backward transformation is determined as outlined before. The range of translucency values can comprise values from 0 (inclusive, representing a fully opaque case) to 1 (inclusive, representing a fully transparent case).

It is possible to determine a forward transformation for different translucency levels by measuring the color and translucency value of results of printing objects with different tonal vectors having different translucency related entries and to use these level-specific transformations for the minimization.

The determination of the backward transformation can be performed independently for each translucency value, in particular in a translucency value-specific iteration. In this case, at least two translucency value-specific iteration can be performed simultaneously and/or the backward transformation resulting from a first translucency value-specific iteration can provide an initial backward transformation for a further translucency value-specific iteration. Alternatively, the translucency value-specific iterations can be performed simultaneously for all translucency values.

Determination of the backward transformation for different translucency levels advantageously allows an accurate reproduction not only of color but also of translucency.

In a preferred embodiment, the forward transformation is performed using a model built by machine learning, wherein the model provides a color value vector as output for a given tonal vector as input.

The model can be built by training, wherein training is performed based on training data, wherein the training data comprises a set of input values, in this case tonal vectors, and a set of corresponding output values, in this case color value vectors. During training, one or more model parameters, e.g. weights and/or connections of a neural network, are varied in order to minimize the difference between the output values of the training data and the output data provided by the model based on the input values of the training data. In other words, training is performed using a loss function (or cost function) which comprises a term representing the aforementioned difference (difference-related term). Model parameters are determined in order to minimize the loss function. Algorithms for training are well-known to the skilled person.

In the given scenario, training data can be generated by measuring the color value of results of printing objects generated by different tonal vectors. It is for instance possible to use the so-called Neugebauer primaries in the tonal space (providing the tonal vectors of the training data) in order to print test objects for which the color values are measured in order to provide the color value vectors of the training data. Algorithm or processes for measuring the color value as well as algorithm for the determination of training data is also known to the skilled person. It is further possible to split the training data into data used for the model parameter determination (parameter determination data) and data used for the validation of the model (validation data). Validation data can be used to determine hyper-parameters such as weights of different terms/sub-losses of the loss function. Further, training can be terminated if the loss function value determined based on the validation data does not decrease more than a predetermined amount between different training steps (so-called early stopping). This enhances the model's generalization capacity. It is further possible to split the training data into parameter determination data, validation data and test data, wherein the test data is then used to finally evaluate the quality of the model determined by the training data and, if any, the validation data.

Providing the forward transformation by such a model advantageously allows to accurately and reliably model the forward transformation for all elements of the tonal space and thus also an accurate and reliable determination of the backward transformation.

In a further embodiment, model parameters are determined such that a loss function is minimized, wherein the loss function comprises a term which anti-correlates with the monotonicity of a relation between the tonal vectors or a portion thereof and the color value vectors, comprising a translucency-related entry if applicable, or a portion thereof (monotonicity-related term which can also be referred to as monotonicity loss). In other words, the loss function comprises a term, wherein the term value increases with a decreasing monotonicity. A relation between an argument, in this case the tonal vector or a portion thereof, and a function value, in this case the color value vectors or a portion thereof, is considered monotonic if for increasing values of the argument, the function value always increases or stays constant (monotonic increase) or increasing values of the argument, the function value always decreases or stays constant (monotonic decrease).

In the context of this invention, a relation is also considered monotonic if for decreasing values of the argument, the function value always decreases or stays the same or if for decreasing values of the argument, the function value always increases or stays the same.

The monotonicity (or a term representing the monotonicity) can in particular be determined such that its value decreases the more violations of one of the above-mentioned criteria exists and/or the higher the violations are. In particular, the monotonicity can be determined such that a value is higher for the case that the function value always increases or stays constant for increasing values of the argument than for the case that the function value decreases for increasing values of the argument. One example to determine a value representing the monotonicity is to determine a first derivative of the function value with respect to the function argument. In case a monotonic increasing behavior is desired, a negative derivative will lead to a decrease of the monotonicity value and to an increase of the loss function. In case a monotonic decreasing behavior is desired, a positive derivative will lead to a decrease of the monotonicity value and to an increase of the loss function.

Alternatively, or in addition, a term which anti-correlates with the smoothness of color value vectors provided for multiple tonal vectors (smoothness-related term which can also be referred to as smoothness loss). In other words, the loss function comprises a term, wherein the term value increases with a decreasing smoothness. One example to determine a value representing the smoothness is to determine a Laplacian of the color value vectors which are outputted by the model for given tonal vectors.

In addition to the monotonicity-related term and/or the smoothness-related term, the loss function can comprise the aforementioned difference-related term. These terms can be used to determine a resulting value of the loss function, e.g. as a sum of all terms. Preferably, the terms are weighted by different weights in order to determine the resulting value. The weights or selected weights from the subset of all weights can be adjusted automatically using the aforementioned validation data. In particular, the weights can be initially set to a predetermined value such that an accuracy determined for the validation data does not deviate more than a predetermined amount from the value determined without the monotonicity loss and the smoothness loss. Then, the weights are increased until the accuracy determined for the validation data starts decreasing more than a predetermined amount/percentage. It is possible to increase the weights by a predetermined multiplication factor, e.g. by 3, until the accuracy starts decreasing more than a predetermined percentage, e.g. 5%. The accuracy can be a measure which represents the difference or deviation between the output values of the validation data and the output data provided by the model based on the input values of the validation data. In particular, the accuracy can be a measure representing a color difference between the output values of the validation data and the output data provided by the model.

Introducing the monotonicity-related term and/or the smoothness-related term advantageously allows improving a quality of the modeling process, in particular since the proposed strategy is more robust against overfitting to the noises/errors in training data, and is more plausible in terms of monotonicity and/or smoothness. A forward predictive model built via the proposed approach is in particular more explainable to down-stream applications in terms of the monotonic relationships of appearance-vs-material-usage. Simulations and test results for different printers have shown that the color value vectors provided by the model which is determined by considering the monotonicity loss are more monotonic than for a model which is determined without considering the loss, in particular that all or almost all monotonicity violations are removed. It was further shown that the color value vectors provided by the model which is determined by considering the smoothness loss are smoother than for a model which is determined without considering the loss.

In a further embodiment, the loss function comprises a term which anti-correlates with the monotonicity of a relation between a portion of the tonal vectors representing the amount of black material(s) and a portion of the color value vector representing lightness. The amount of black material can be represented by the K value of a CMYK vector. The portion of the color value vector representing the lightness can e.g. correspond to the L* value of the L*a*b* vector. Depending on the type of color value vector and tonal vector chosen, other parameters can represent the amount of black material/lightness.

Alternatively, the loss function comprises a term which anti-correlates with the monotonicity of a relation between a portion of the tonal vectors representing the amount of clear material(s) and a portion of the color value vector representing translucency. The amount of clear material can be represented by CI of a CMYKWCI vector (known to the skilled person). It is also possible that the amount of clear material is represented by a y value of a CMYKy vector, where y correlates with the percentage of clear material within the fraction of the material mixture not occupied by CMYK materials and wherein the missing fraction is occupied intrinsically by white material.

The portion of the color value vector representing translucency can correspond to the A-value (or a value) of a L*a*b* A (or L*a*b* a) vector. The A or α value is e.g. defined in the document "Urban, P., Tanksale, T. M., Brunton, A., Vu, B. M., & Nakauchi, S. (2019). Redefining a in RGBA: towards a standard for graphical 3D printing. ACM Transactions on Graphics (TOG), 38(3), 1-14". In this scenario, the color value vector comprises an entry representing a translucency (and can then also be referred to as color and translucency value vector), wherein the tonal vector comprises an entry representing clear/transparent material. Depending on the type of color value vector and tonal vector chosen, other parameters can represent the amount of black material/darkness.

Simulations and test results have shown that the proposed terms result in a very smooth forward transformation ensuring the desired monotonicity without sacrificing accuracy, i.e. provide very accurate color predictions with desired monotonicity but without undesired sudden changes of color predictions for changing tonal vectors.

In a further embodiment, the partial derivatives of a lightness value with respect to the black material entries of the tonal vectors are determined for a given set of tonal vectors, wherein the loss function comprises a term representing the sum of all positive partial derivatives. The lightness value can be determined from the color value vectors provided by the forward transformation for the given tonal vectors. The lightness value can be the L* value of the L*a*b* vector.

Alternatively or in addition, the partial derivatives of a translucency value with respect to the transparent material entries of the tonal vectors are determined for a given set of tonal vectors, wherein the loss function comprises a term representing the sum of all positive partial derivatives. The translucency value can be determined from the color value vectors provided by the forward transformation for the given tonal vectors. In each of both cases, the sum can be normalized by the number of positive derivatives which are summed. This advantageously allows a simple and fast but accurate determination of the monotonicity-related term which results in a low computational load for a computing unit.

In a further embodiment, the loss function comprises a term which correlates with a value representing the value or the amount/sum of values, in particular the absolute value or the amount/sum of absolute values, of second-order derivatives of color value vectors provided for multiple tonal vectors. It is possible to determine for one single entry, in particular the L* entry, for selected but not all entries or for each entry of a color value vector the unmixed second-order derivatives with respect to m entries of the tonal vectors which results in n second-order derivative vectors with m entries for each color value vector (with n being the dimension of the color space and m being the dimension of the tonal space). For each of the derivative vectors, a sum over all entries is determined, wherein the summands of the sum are provided by a transformation on each entry such as a logarithm of the sum of the entry or the absolute value of the entry and 1. It is, however, clear to the skilled person that other transformations of the entries can be chosen in order to determine the summands. Instead of determining the unmixed second-order derivatives, it is also possible to determine the mixed second-order derivatives in order to determine the loss function term.

Incorporation of such a transformation on derivatives advantageously makes the training more stable. To determine the loss function term, this vector-specific sums can be summed up. The term can be normalized by the product of n and the number of color value vectors. Incorporation of such a normalization on the term advantageously further increases the training stability.

In a further embodiment, the training data is at least partially generated by sampling the tonal space. To evaluate the monotonicity-related and/or the smoothness-related term in the loss function it is not required that the training data comprises measured output values (though the computation of other loss terms, i.e. the aforementioned difference-related terms require the measured output values thus are performed on a separate pre-defined measured data), i.e. measured color value vectors, as only derivatives are required to evaluate the monotonicity and/or the smoothness of the output values predicted by the model in order to determine the model parameters together with other loss terms i.e. the aforementioned difference-related terms. This results in the fact that training data can comprise tonal vectors being arbitrary samples of the tonal space and that it is not required to know the real color value vectors assigned to the tonal vectors. It is for instance possible to generate a predetermined number of samples of the tonal space, e.g. 2,000 samples. Moreover, the training can comprise multiple epochs, wherein training in each epoch is performed with different training data. The resulting model of a previous epoch can be the initial model of a subsequent epoch. It is possible that 10,000 epochs of training are performed in order to build the model. As a consequence, a simple and uncomplex training can be performed which in particular reduces the time and effort required to determine the model.

In general, the model used for the forward transformation allows to better model influencing factors of appearance reproduction since for physical models the printer is required to behave according to the physical assumptions which is not always correct or completely correct and can result in large appearance deviations. Further, the proposed way of determination is more robust against overfitting to the noises/errors in training data, and is more plausible in terms of not only monotonicity but also smoothness. A forward predictive model built via the proposed approach is more explainable to down-stream applications in terms of the monotonic relationships of appearance-vs-material-usage. The backward transformation optimized or generated by the proposed approach is not only color accurate but also smooth in color gradients. Therefore, the algorithm is able to remove artifacts introduced by the color profile creation and creates a better appearance of prints. For a backward transformation beyond the color appearance, the distance between the gamut mapped and the original colors is minimized, in particular with respect to the image difference metric. Also, for different translucency levels the best colors (with respect to the image difference metric) with respect to the optimal colors are achieved.

The method for determining the forward transformation, i.e. the method for determining model parameters of the model used by the forward transformation, can provide an independent invention. Therefore, a method for determining the forward transformation, i.e. the method for determining model parameters of the model used by the forward transformation, is described, wherein model parameters are determined such that a loss function is minimized, wherein the loss function comprises a term which anti-correlates with the monotonicity of a relation between the tonal vectors or a portion thereof and the color value vectors or a portion thereof and/or a term which anti-correlates with the smoothness of color value vectors provided for multiple tonal vectors. This method can also comprise one or more further aspects related to the method which are disclosed in this disclosure. The forward transformation or model provided by the described method advantageously allows to generate a simulate model of a printing object in a device-independent color space for given tonal vectors for a specific printing device. This is in particular of interest in order to simulate out-of-gamut values for a specific printing device.

Further proposed is a computer program product with a computer program, wherein the computer program comprises software means for the execution of one, multiple or all steps of the method for determining a tonal vector for generating a control signal for a printing device according to one of the embodiments described in this disclosure if the computer program is executed by or in a computer or an automation system. The computer or automation system can comprise or be provided by the aforementioned computing unit, wherein the computing unit can be provided or comprise at least one microcontroller or integrated circuit. The computer program can further comprise software means for the execution of one, multiple or all steps of the method for generating control signals or the method for producing an object according to one of the embodiments described in this disclosure if the computer program is executed by or in a computer or an automation system.

Further described is a program which, when running on a computer, in particular the proposed computer device or system, or in any other suitable automation system, causes the computer or the (automation) system to perform one or more or all steps of the method for determining a tonal vector for generating a control signal for a printing device, for generating control signals or for producing an object according to one of the embodiments described in this disclosure and/or to a program storage medium on which the program is stored (in particular in a non-transitory form) and/or to a computer comprising the program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

This means that the method or parts of the method in accordance with the invention is for example a computer implemented method. For example, all the steps or merely some of the steps (i.e. less than the total number of steps) of the method in accordance with the invention can be executed by a computer, in particular by the disclosed computer device or system. An embodiment of the computer implemented method is a use of the computer for performing a data processing method. The computer for example comprises at least one microcontroller or processor or integrated circuit and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating steps described are for example performed by a computer.

Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right.

Steps executed or performed by a computer or an automation system can in particular be the transformation using the backward transformation and/or the determination of the backward transformation and/or the determination of the model parameters used for the forward transformation.

The computer program product advantageously allows to perform a method for determining a tonal vector for generating a control signal for a printing device, for generating control signals or for producing an object according to one of the embodiments described in this disclosure for which technical advantages have been outlined before. Also described is a computer program product with a computer program, wherein the computer program comprises software means for the execution of one, multiple or all steps of the method for generating control signal for a printing device or of the method for printing a printing object according to one of the embodiments described in this disclosure if the computer program is executed by or in a computer or an automation system.

Further proposed is a printing system, wherein the printing system comprises a printing device (2D or 3D printing device) and at least one control unit, wherein the control unit is configured to perform a method for determining a tonal vector for generating a control signal for the printing device or for generating control signals according to one of the embodiments described in this disclosure. The printing system can be a printing system for producing an object according to one of the embodiments described in this disclosure. The control unit and the printing device can be provided by separate devices or by a common device.

The control unit and the printing device can be connected by a wired or wireless data connection, wherein the control data generated by the control unit is transmitted to the printing device via the data connection. The printing device can have an interface to receive the control data. The printing device can comprise at least one means for printing a printing material. In case of a 3D printing device, the printing device can also be referred to as additive manufacturing device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

The invention is further described with reference to the attached figures. The figures show:

FIG. 1 is a schematic flow diagram of a method for determining tonal vectors according to the invention, FIG. 2 is a schematic flow diagram of a method for determining a backward transformation according to the invention, FIG. 3 shows a schematic determination of an adjusted backward transformation, within the determination of a backward transformation, FIG. 4 is a schematic flow diagram of a method for determining a backward transformation in a further embodiment, FIG. 5 is a schematic flow diagram of a method for determining a forward transformation, FIG. 6 is a schematic block diagram of a printing system.

In the drawings, reference numbers may be reused to identify similar and/or identical elements.

DETAILED DESCRIPTION

Figure 7:
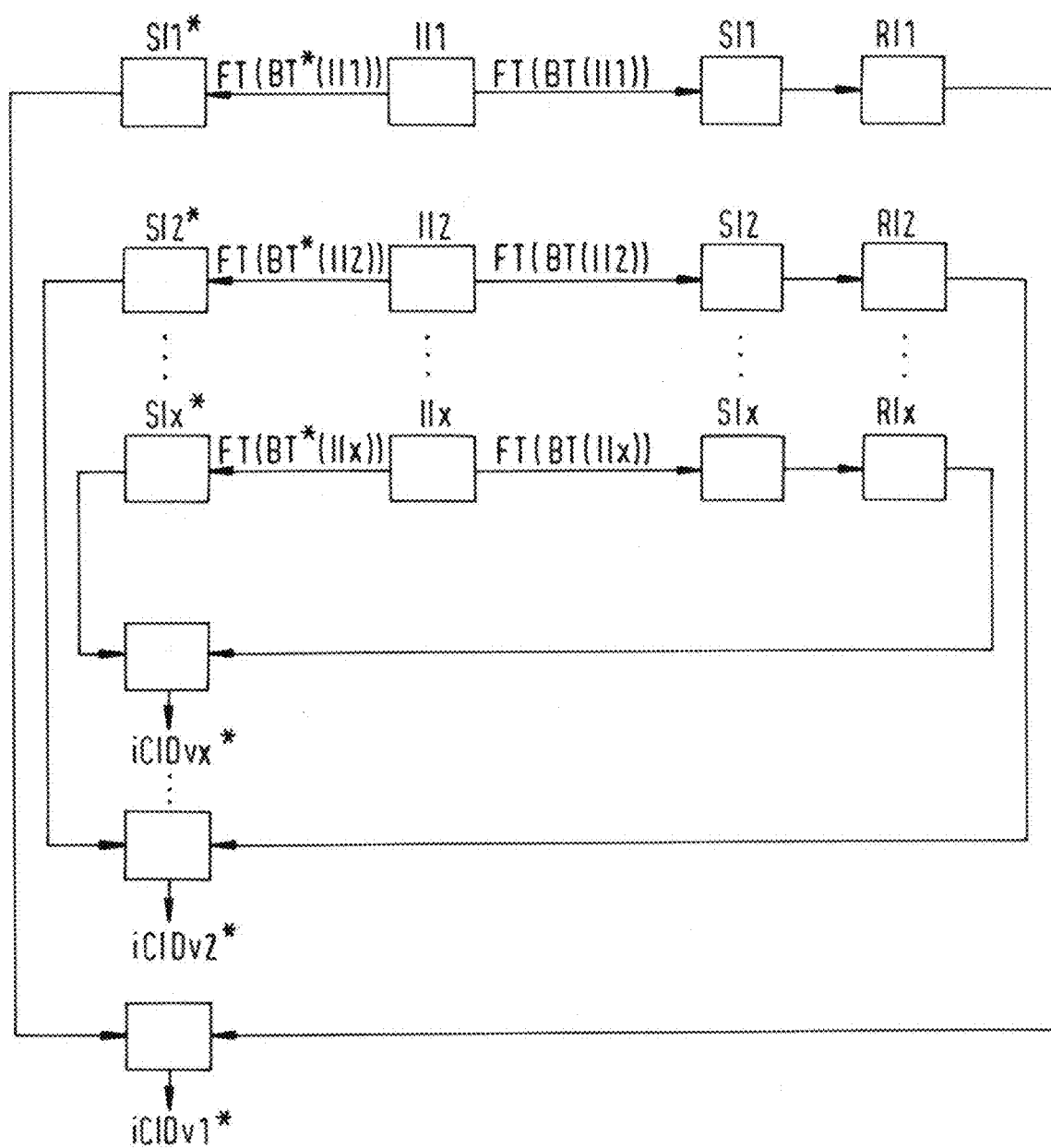
FIG. 7 is a schematic flow diagram of using multiple reference images for the determination of the backward transformation.

FIG. 1 shows a schematic flow diagram of a method for determining tonal vectors TV according to the invention. In a preprocessing step S0, input data can be generated. The input data can encode color and, if desired, shape and/or translucency information of an object 2 which is to be reproduced by the printing process (printing object 2).

It is also possible that a voxelization is performed in the preprocessing step S0 by which voxels of a printer-specific build space can be classified as object voxels or non-object voxels and that color and, if applicable, translucency information are assigned to each object voxel. Suitable voxelization and assignment algorithms are known to the skilled person and are not subject of the proposed invention.

In a first step S1, a device-independent color value vector CV can be determined. The color value vector can be determined based on the aforementioned input data. As an example, the the vector can be determined as a L*a*b*-vector in the CIELAB color space. Further, a device-independent color value vector CV can be assigned to each object voxel.

In a second step S2, the color value vector CV can be transformed into a tonal vector TV using a backward transformation BT. The backward transformation BT is determined before the second step S2 is performed. It is possible that the backward transformation BT is determined in the preprocessing step S0. It is, however, also possible that the backward transformation is determined as a step of the proposed method, e.g. a step performed after the first step S1 but before the second step S2 (not shown).

This backward transformation BT is determined using a cost function based on an image difference metric iCID (see FIG. 2), wherein the image difference metric iCID provides an output value, i.e. an image difference metric value, which represents a difference between two images being an input for the metric, namely a reference image RI comprising device-independent color value vectors CV and a simulated image SI, wherein the simulated image SI is determined by transforming the reference image RI into a tonal image using the backward transformation BT and transforming the tonal image into the simulated image SI by using a forward transformation FT.

The tonal vector TV can then be used to generate a control signal CS for a printing device 1 (see FIG. 6). The generation can e.g. be performed in a third step S3. It is possible to determine one printing material or a mixture of multiple printing materials to be applied to a selected voxel of the printing object 2 based on the tonal vectors TV and to generate control signals CS by which the printing device 1 can be controlled accordingly and such that a printing object 2 is printed. This generation can involve performing a halftoning process. Then, in a fourth step S4, the control signal CS can be transmitted to the printing device 1 which then prints the object 2 (printing step).

FIG. 2 shows a schematic flow diagram of a method for determining a backward transformation BT according to the invention. In a first step S1, an initial backward transformation BT can be determined, e.g. as a predetermined or preset transformation.

One example way to determine the initial backward transformation is to apply commercially available tools which are listed with corresponding vendors e.g. on https://www.color.org/profilingtools.xalter and which provide a printer-specific profile. Such an application can e.g. comprise the steps of producing test prints and measure the color and translucency and use these information as input to tools providing a printer-specific profile according to the ICC standard (see e.g. Specification ICC.1:2010 (profile version 4.3.0.0)— Image technology colour management—Architecture, profile format, and data structure, revision of ICC.1: 2004-10, 2010), wherein a backward transformation is part of the profile according to the standard. To provide an initial backward transformation with color value vectors comprising color-related entries and at least one translucency-related value, the determination of the backward transformation is described in the aforementioned document "A. Brunton, C.

A. Arikan, T. M. Tanksale, and P. Urban, "3d printing spatially varying color and translucency," ACM Transactions on Graph. (TOG) 37, 157:1-157:13 (2018)" and its aforementioned appendix C.

Further, a standing image difference metric value iCIDv can be initialized, e.g. by a predetermined maximum value. Further, a counter variable k for counting the number of iterations is initialized, e.g. by the value 1.

In a second step S2, an adjusted backward transformation BT* is determined. To determine the adjusted backward transformation BT*, at least one parameter of the actual backward transformation BT can be changed. As an example, the backward transformation BT can be performed using a CLUT (see above) by which tonal vectors TV are assigned to selected color value vectors CV (so-called grid points of the color space), wherein the determination of an adjusted backward transformation BT* comprise the change of at least one tonal vector TV of the CLUT.

Using the adjusted backward transformation BT*, an adjusted or updated image difference metric value iCIDv* can be determined in a third step S3.

In a fourth step S4, it is determined if the difference between the updated image difference metric value iCIDv* and the standing, unadjusted image difference metric value iCIDv is smaller than a predetermined threshold value thr1. If this is the case, the standing backward transformation BT is set as updated backward transformation BT* and the standing image difference metric value iCIDv is set as updated image difference metric value iCIDv* in a fifth step S5. If this is not the case, the standing backward transformation BT is not changed. It is also possible that the determination is terminated in this case and the standing backward transformation BT provides the desired result, in particular if the difference is equal to or higher than the predetermined threshold value thr1 for a predetermined number of subsequent iterations.

The updated image difference metric value iCIDv* represents a difference between the reference image RI comprising/consisting of device-independent color value vectors CV and a simulated image SI, wherein the simulated image SI is determined by transforming the input image II into a tonal image using the backward transformation BT and transforming the tonal image into the simulated image SI by using a forward transformation FT. It is possible that the reference image RI is a two-dimensional image with the pixels being provided by color value vectors CV. In this case, the simulated image SI is also a two-dimensional image with the pixels being provided by simulated color value vectors CV. The tonal image can also be a two-dimensional image with the pixels being provided by tonal vectors TV. The determination of a reference image RI has been explained before.

In a six step S6, it is determined if the standing counter value k is smaller than a preset maximum value k max. If this is the case, the counter value k is increment by 1 and the method returns to the second step S2. If this is not the case, the determination of the backward transformation BT is terminated and the standing backward transformation BT provides the desired result.

In other words, the backward transformation BT can be determined by using the CLUT and the iCID color image quality metric in order to compare the aforementioned simulated image SI being an output of the backward BT and the forward transformation, FT with a reference image RI, and then iteratively alter the entries in the CLUT to minimize that metric. The reference image RI can be determined using the tonal vectors of the grid points of the initial CLUT (being a part of the initial backward transformation BT) and a preset forward transform as a starting point. Then, the transformed tonal vectors of the CLUT, in particular with the exception of the white point, are filtered to remove outliers or correct certain properties. These computations can be performed in the CIELCh color space. Example computations have been explained before. The result is a set of filtered CIELAB color value vectors that correspond to the grid points. Reference images can then be computed from these points via trilinear interpolation. It is possible to then postprocess such a reference image in order to smooth errors introduced by the interpolation. Such postprocessing can be performed in a hue-linearized CIELCh space. For the lightness channel, a 2D image filter can be applied in the in C-h-plane, in particular for colors out of the gamut. Such a 2D filter can e.g. be a box filter such as a 3×3 box filter which determines an average of L* values of a 3×3 pixel window. For the chroma C channel, a 3D image filter can be applied, in particular for colors out of gamut. Such a 3D filter can e.g. be a box filter such as a 3×3×3 box filter which determines an average of C* values of a 3×3×3 voxel window. For the hue channel, entries can be set to the ideal hue, i.e. the hue value of the corresponding pixel color of the input image.

Further, it is possible to determine the sets of grid points that can be optimized in parallel. In particular, neighboring grid points cannot be part of the same set and the space in between these grid points forms the partition where the iCID is evaluated. Also, grid points that lie within any iCID window of the partition cannot be in the same set, as well as neighbors of those points. This has been explained above.

Further, the tonal vectors TV assigned to the grid points are optimized with respect to tonal value entries of the tonal vectors of the CLUT. It is possible but not mandatory to exclude the white point from this optimization. This can involve computing a set of tonal value offsets that are used as steps for the evaluation of alternative tonal values of one selected tonal vector TV in the CLUT. For CMYK vectors, at least 8 directions have to be considered. Then, for each set, an iteration over all computed tonal value offset is performed which involves, for each member of the set, to temporarily replace the tonal value with the tonal value plus the offset and to compute, with the adjusted backward transformation BT*, a simulated image SI, i.e. a softproof, of the input images II and use the iCID metric to measure the difference between this softproof and the reference image RI. Further, an Laplacian on the tonal images to evaluate the corresponding smoothness in the tonal space can be considered in the cost function.

For each grid point compare the image difference metric value and, if applicable, the tonal smoothness value in its partition for the different tonal value offsets, permanently replace the value of the entry with the tonal value plus the offset that achieved the smallest image difference metric value and smoothness value averaged over the partition.

It is also possible that for some iterations, a median filter on the CLUT matrix is computed and the table entries are shifted towards the median. This median shift is a regularization step ensuring smooth tonal values assigned to grid points. It prevents the iteration to stuck in a local minimum. After a few iterations with the median shift the tonal values of the grid points are smooth and the median shift is no longer needed.

For profiles of printing devices 1 with attributes beyond color, the algorithm is repeated with different fixed levels of the additional materials or tonal values, in particular values of an entry representing a clear or translucent material such as the aforementioned y value.

For a lowest level, i.e. where the additional materials are not used or the respective tonal value of these additional material(s) is zero, the procedures is the same as described above. For higher levels, i.e. where different amounts of the additional materials are mixed in or the additional tonal value is not zero, the results of the previous level are used as a starting point and then optimized. In this case the white point of this level is not fixed but altered by the optimization.

FIG. 3 shows a schematic determination of an adjusted backward transformation BT* within the determination of a backward transformation BT. In the shown embodiment, the backward transformation BT uses a CLUT. In the example CLUT shown in FIG. 3, a first tonal vector TV1 is assigned to a first selected color value vector CV1, a second tonal vector TV2 is assigned to a second selected color value vector CV2 and an n-th tonal vector TVn is assigned to an n-th selected color value vector CVn. If a given input color value vector CV for the backward transformation BT equals to one of the selected color value vectors CV1, CV2, . . . , CVn being an entry of the CLUT, the output tonal vector will be the tonal vector TV1, TV2, TVn assigned to the entry. If a given input color value vector CV for the backward transformation BT does not equal to one of the selected color value vectors CV1, CV2, . . . , CVn being an entry of the CLUT, the output tonal vector will be determined by an interpolation using the tonal vector TV1, TV2, TVn being entries of the CLUT. This is known to the skilled person.

Adjusting the backward transformation BT to determine the adjusted backward transformation BT* involves changing (or updating) one tonal vector TV2 being an entry of the CLUT which results in an adjusted CLUT*. In the embodiment shown in FIG. 3, the second tonal vector TV2, i.e. the tonal vector TV assigned to the selected color value vector CV2, is adjusted to an adjusted tonal vector TV2*. Adjusting a tonal vector TV can comprise the change of the value of exactly one entry of the tonal vector TV or the change of the values of more than one entry of the tonal vector TV, e.g. by a predetermined amount or percentage. It is possible to change the values of each entry of the tonal vector TV in different iterations steps.

FIG. 4 a schematic determination of an adjusted backward transformation BT* within the determination of a backward transformation BT in a further embodiment. In contrast to the embodiment shown in FIG. 3, the adjustment of the backward transformation BT to determine the adjusted backward transformation BT* involves changing (or updating) two or even more tonal vectors TV2, TVg being entries of the CLUT which results in an adjusted CLUT*. In the embodiment shown in FIG. 4, the second tonal vector TV2, i.e. the tonal vector assigned to the selected color value vector CV2, and a g-th tonal vector TVg, i.e. the tonal vector assigned to a selected g-th color value vector CVg, are adjusted to adjusted tonal vectors TV2*, TVg* respectively. The adjusted tonal vectors TV2*, TVg* are assigned to color value vectors CV2, CVg which are selected such that the g-th color value vector CVg is not arranged in an influenced neighborhood of the second color value vector CV2, wherein the influenced neighborhood comprises color values vectors being affected by the change of the tonal vector TV2 which is assigned to the second color value vector CV2.

The adjustments of the second and the g-th tonal vector TV2, TVg can be performed simultaneously to an adjustment of one or more tonal vectors from the set of remaining tonal vectors TV1, . . . , TVn. In other words, an iteration step which involves the adjustment of the second and the g-th tonal vector TV2, TVg can be performed simultaneously to an iteration step which involves the adjustment of one or more tonal vectors from the set of remaining tonal vectors TV1, . . . , TVn.

FIG. 5 shows a schematic flow diagram of a method for determining a forward transformation FT. The forward transformation FT can be performed by a neural network NN, wherein the neural network is trained when the forward transformation FT is determined.

In a first step S1, a standing forward transformation FT can be initialized, e.g. by a predetermined or preset transformation. If a neural network is used, the weights of the neural network can be initialized using the Xavier normal initializer which is described in the document "X. Glorot and Y. Bengio, "Understanding the difficulty of training deep feedforward neural networks," in Proceedings of the thirteenth international conference on artificial intelligence and statistics, (2010), pp. 249-256".

It is possible to use a multi-path fully-connected neural network that predicts the color value vector CV. In case only color, i.e. the reflectance, should be predicted, the predicted color value vectors CV comprise only color-related entries. In case also the translucency should be predicted, the predicted color value vectors CV may also comprise a translucency-related entry. In the latter case, the neural network can have two paths corresponding to two predicting tasks, i.e. the color-predicting task and the translucency-predicting task. Built upon the tonal vector input layer is the "trunk" that consists of several hidden layers to learn generic features across tasks, then it splits into two "branches" to learn task-specific features via extra hidden layers in each branch until the branch's output layer. Such a neural network is described in the document "D. Chen and P. Urban, "Deep learning models for optically characterizing 3d printers," Opt. Express 29, 615-631 (2021)".

In a second step S2, an adjusted forward transformation FT* is determined, e.g by adjusting one or multiple parameters of the standing forward transformation FT. This can also be referred as training of the model. Within training, a loss function LF can be evaluated, wherein the adjustment is performed such that the loss function LF is minimized. The loss function LF comprises different terms. A first term represents the difference between output values OV_TD of predetermined training data and the output values provided by the model based on the input values IV_TD of the training data. The input values IV_TD of the training data can be tonal vectors TV and the output values OV_TD of the training data can be the corresponding color value vectors CV. It is possible that the training data further comprises input values IV_TD which are determined by sampling the tonal space and to which no output value OV is assigned.

A second term of the loss function anti-correlates with the monotonicity of a relation between a portion representing the amount of black material of the tonal vectors TV provided by the input values IV_TD and a portion representing lightness of the color value vectors CV provided as the output values determined by the forward transformation FT based on the input values IV_TD of the training data. The second term can be the sum of all positive partial derivatives of a lightness value determined from the color value vectors CV with respect to black material entry, e.g. the K-entry, of the tonal vectors TV which is divided by the number of all positive partial derivatives. A third term of the loss function anti-correlates with the monotonicity of a relation between a portion representing the amount of a clear material of the tonal vectors TV and a portion representing translucency of the color value vectors CV. In this case, the tonal vectors TV used as input values comprise an entry representing the amount of a clear printing material and the color value vectors comprise an entry representing the degree of translucency. The third term can be the sum of all positive partial derivatives of a translucency value determined from the color value vectors CV with respect to clear material entry of the tonal vectors TV which is divided by the number of all positive partial derivatives. A fourth term of the loss function represents a second-order derivatives-based smoothness term of the color value vectors CV determined by the forward transformation FT based on the input values IV_TD of the training data. This term can also be a Laplacian-like loss. Suitable training algorithms are known to the skilled person. In other words, monotonicity constraints are injected into the training, in particular into the loss function used for the training of the neural network as described in the aforementioned document "D. Chen and P. Urban, "Deep learning models for optically characterizing 3d printers," Opt. Express 29, 615-631 (2021)". This injection is based on the idea that a monotonic decreasing function should always have negative derivative everywhere w.r.t. the dependent variables in the entire input domain. Specifically, an extra training loss term which can be referred to as monotonicity loss is added which penalizes on positive derivatives in order to push the model to always have negative derivatives. The training loss is computed on lightness-vs-black-material and translucency-vs-clear-material relationships separately. Note that monotonicity losses are calculated based on derivatives and it does not need groundtruth or measurement in color or translucency as required by the difference-related loss. Training samples for calculating monotonicity loss can therefore be re-sampled from the whole tonal space at each training iteration, thus varies from iteration to iteration. An advantage is that theoretically an infinite data pool for training exists, which could improve the model generalization. The derivatives of a neural network's output w.r.t. its input can e.g. be computed via the "tf.GradientTape" API of TensorFlow which is described in the document M. Abadi et. al., "TensorFlow: Large-scale machine learning on heterogeneous systems," (2015). Corresponding software is available from https://www.tensorflow.org.

Also injected is a so-called smoothness constraint (i.e. the third constraint). This injection is performed via a second-order derivative-based smoothing loss, in other words a Laplacian-like loss, because its calculation is related to Laplacian which is a common operator in image processing and computer vision for the purpose of e.g. edge detection and blob detection. Specifically, a chosen Laplacian-like loss penalizes on Laplacian components i.e. unmixed second-order derivatives of color lightness w.r.t. the usage of each material.

The overall loss function can be a weighted average of the original loss adopted from the document "D. Chen and P. Urban, "Deep learning models for optically characterizing 3d printers," Opt. Express 29, 615-631 (2021)" (i.e. the difference related term) and the two monotonicity losses (one for the lightness-vs-black-material relationship and the other for the translucency-vs-clear-material relationship) and Laplacian-like smoothness loss. The original loss from the aforementioned document can have a weight of 1.0. The weights assigned to each of the remaining losses can be tuned as hyper-parameters that are automatically determined based on validation data. The weights can be initially set to a very small positive value, so that these additional monotonicity and smoothness loss terms almost do not affect the prediction accuracy on validation data. Then, the weights can be increased until the prediction accuracy on validation data starts decreasing. Specifically, the weights can be increased by a factor of 3 until the average CIEDE2000 error on validation data increases by 5% of the minimum error achieved so far on validation data.

In the given scenario, a portion of the training data can be generated by measuring the color value of results of printing objects generated by different tonal vectors TV. A further portion of the training data can be generated, as mentioned before, as selected samples of the tonal space.

As a result of the training, i.e. the second step S2, a resulting forward transformation can be provided.

FIG. 6 shows a schematic block diagram of a 3D printing system 3 which is configured to print/build a printing object 2. The printing system 3 comprises a printing device 1 and at least one control unit 4, wherein the control unit 4 is configured to perform a method for determining a tonal vector TV for generating a control signal CS for the printing device 1 as described before. Further, the control signal CS can be transmitted to the printing device 1. The printing device 1 is controlled by the control signal CS such that a desired printing object 2 is built. The printing system 3 can be a 2D printing system or a 3D printing system. In the latter case, the printing device 1 is a 3D printing device and the printing object can be a three-dimensional printing object. The control unit 4 can comprise or be provided by a microcontroller or integrated circuit. In particular, the control unit 4 can comprise or provide one or more computing unit(s).

FIG. 7 shows a schematic flow diagram of using multiple reference images RI1, RI2, . . . , RIx for the determination of the backward transformation BT. First, an initial set of multiple, namely x, input images II1, II2, . . . , IIx is generated. Different input images II1, II2, . . . , IIx can consist of different device-independent color value vectors CV. In particular, different input image II1, II2, . . . , IIx comprise a*- and b*-values for different and in particular equally space L*-values. It is possible that for each L*-value of the range from 0 (inclusive) to 100 (inclusive), i.e. for 101 different L* values, an input image with 256 different and in particular equally space a*-values, e.g. ranging from −127 (inclusive) to 128 (inclusive), and 256 different and in particular equally space b*-values, e.g. ranging from −127 (inclusive) to 128 (inclusive), is generated in order to provide x=101 different 256×256 input images II1, II2, . . . , IIx. Before minimization starts, these input images II1, II2, . . . , IIx are transformed or filtered in order to determine x reference images RI1, RI2, . . . , RIx. In a first step, an input image II1, II2, . . . , IIx is transformed into the tonal space using an initial backward transformation BT. In a second step, the resulting tonal image is transformed into the color space by using a forward transformation FT and a simulated image SI1, SI2, . . . , SIx is provided. The simulated images SI1, SI2, . . . , SIx are then adapted (filtered) according to at least one criterion. The resulting images are the reference image RI1, RI2, . . . , RIx. Example adaption processes have been explained before.

During the determination of the backward transformation BT, i.e. during the iterations, the input images II1, II2, . . . , IIx from the initial set are transformed into the tonal space using an adjusted backward transformation BT*. In a second step, the resulting tonal image is transformed into the color space by using a forward transformation FT in order to provide a simulated image SI1*, SI2*, . . . , SIx*. Then, the image difference metric value, in particular, the aforementioned improved image difference metric values iCIDv1*, iCIDv2*, . . . , iCIDvx* can be determined, wherein a first image difference metric value iCIDv1* is determined based on the first simulated image SI1* and the first reference image RI1, a second image difference metric value iCIDv2* is determined based on the second simulated image SI2* and the second reference image RI1 and a x-th image difference metric value iCIDvx* is determined based on the x-th simulated image SIx* and the x-th reference image Rix, the simulated images SI1*, SI2*, . . . , SIx* and the reference images RI1, RI2, . . . , Rix being input parameters for the evaluation of the image difference metric. The reference images RI1, RI2, . . . , Rix are not changed during the determination of the backward transformation BT.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase at least one of A, B, and C should be construed to mean a logical (A OR B OR C), using a non-exclusive logical OR, and should not be construed to mean "at least one of A, at least one of B, and at least one of C."

The invention claimed is:

1. A method for determining a tonal vector for generating a control signal for a printing device, the method comprising:
    providing a device-independent color value vector;
    determining a backward transformation that minimizes a cost function including an image difference metric term;
    transforming the device-independent color value vector into the tonal vector using the backward transformation; and
    generating a simulated image by:
        transforming an input image into a tonal image using the backward transformation, and
        transforming the tonal image into the simulated image by using a forward transformation,
    wherein the image difference metric term represents a difference between:
        a reference image including device-independent color value vectors, and
        the simulated image.

2. The method of claim 1 wherein:
    the backward transformation is performed using an assignment of tonal vectors to selected device-independent color value vectors; and
    at least one tonal vector of the assignment is varied in order to minimize the cost function.

3. The method of claim 2 wherein:
    the minimization is performed iteratively;
    in each iteration step, only a proper subset of all tonal vectors of the assignment is varied; and
    the varied tonal vector replaces the original tonal vector if the cost function value is decreased.

4. The method of claim 3 wherein:
    a first subset of tonal vectors are varied in a first iteration step, and
    a second subset of tonal vectors are varied in a further iteration step.

5. The method of claim 4 wherein:
    the tonal vectors of the proper subset are selected as tonal vectors (TV2, TVg) that are assigned to color value vectors (CV2, CVg) of a subset of the device-independent color value vectors;
    the color value vectors (CV2, CVg) of the subset are chosen such that no other color value vector (CV2, CVg) of the subset is arranged in an influenced neighborhood of a selected color value vector (CV2, CVg) of the subset; and
    the influenced neighborhood includes color values vectors being affected by the change of the tonal vector (TV2, TVg) that is assigned to the selected color value vector (CV2, CVg).

6. The method of claim 4 wherein:
    for each tonal vector of the proper subset, the tonal vector is assigned to a color value vector from a selected subset of the device-independent color value vectors; and
    for each color value vector of the selected subset:
        an influenced neighborhood corresponding to the color value vector is defined by color values vectors that are affected by a change of the tonal vector of the proper subset that is assigned to the color value vector, and
        no other color value vector of the selected subset is arranged in the influenced neighborhood.

7. The method of claim 3 wherein:
    the tonal vectors of the proper subset of all tonal vectors of the assignment are selected as tonal vectors (TV2, TVg) that are assigned to color value vectors (CV2, CVg) of a subset of the device-independent color value vectors;
    the color value vectors (CV2, CVg) of the subset are chosen such that no other color value vector (CV2, CVg) of the subset is arranged in an influenced neighborhood of a selected color value vector (CV2, CVg) of the subset; and
    the influenced neighborhood includes color values vectors being affected by the change of the tonal vector (TV2, TVg) that is assigned to the selected color value vector (CV2, CVg).

8. The method of claim 3 wherein:
    for each tonal vector of the proper subset, the tonal vector is assigned to a color value vector from a selected subset of the device-independent color value vectors; and
    for each color value vector of the selected subset:
        an influenced neighborhood corresponding to the color value vector is defined by color values vectors that are affected by a change of the tonal vector of the proper subset that is assigned to the color value vector, and
        no other color value vector of the selected subset is arranged in the influenced neighborhood.

9. The method of claim 3 wherein variations of multiple tonal vectors are performed simultaneously.

10. The method of claim 1 wherein:
    the image difference metric is evaluated based on color value vectors in a first metric window and a further metric window;
    the first metric window is a window with a predetermined size around a color value vector for which the metric or a part thereof is to be evaluated in the simulated image;
    the further metric window is a window with the predetermined size around the corresponding color value vector in the reference image; and the color value vectors of the subset are chosen such that an influence neighborhood of a selected color value vector of the subset does not overlap with the metric window of all remaining color value vectors of the subset.

11. The method of claim 1 wherein the reference image is determined by transforming the tonal vectors assigned to selected device-independent color value vectors into a transformed input image using the forward transformation and adapt the transformed image according to at least one criterion.

12. The method of claim 1 wherein the cost function further includes a term representing a Laplacian of the tonal image.

13. The method of claim 1 wherein:
the forward transformation is performed using a model built by machine learning; and
the model provides a color value vector as output for a given tonal vector as input.

14. The method of claim 13 further comprising:
determining model parameters that minimize a loss function,
wherein the loss function includes at least one of:
a term that anti-correlates with the monotonicity of a relation between the tonal vectors or a portion thereof and the color value vectors or a portion thereof, and
a term that anti-correlates with the smoothness of color value vectors provided for multiple tonal vectors.

15. The method of claim 14 wherein the loss function includes at least one of:
a term that anti-correlates with the monotonicity of a relation between a portion of the tonal vectors representing the amount of black material(s) and a portion of the color value vector representing lightness; and
a term that anti-correlates with the monotonicity of a relation between a portion of the tonal vectors representing the amount of clear material(s) and a portion of the color value vector representing translucency.

16. The method of claim 15 wherein the loss function includes a term that correlates with a value representing a value of second-order derivatives of color value vectors provided for multiple tonal vectors.

17. The method of claim 14 wherein the loss function includes a term that correlates with a value representing a value of second-order derivatives of color value vectors provided for multiple tonal vectors.

18. A non-transitory computer-readable medium comprising instructions including:
providing a device-independent color value vector;
determining a backward transformation that minimizes a cost function including an image difference metric term;
transforming the device-independent color value vector into a tonal vector using the backward transformation;
generating a simulated image by:
transforming an input image into a tonal image using the backward transformation, and
transforming the tonal image into the simulated image by using a forward transformation, wherein the image difference metric term represents a difference between:
a reference image including device-independent color value vectors, and
the simulated image; and
generating a control signal based on the tonal vector.

19. A printing system comprising:
a printing device; and
a control unit configured to:
provide a device-independent color value vector;
determine a backward transformation that minimizes a cost function including an image difference metric term;
transform the device-independent color value vector into a tonal vector using the backward transformation;
generate a simulated image by:
transforming an input image into a tonal image using the backward transformation, and
transforming the tonal image into the simulated image by using a forward transformation, wherein the image difference metric term represents a difference between (i) a reference image including device-independent color value vectors and (ii) the simulated image;
generate a control signal for a printing device based on the tonal vector; and
control the printing device according to the control signal.

* * * * *